(No Model.)
J. L. MITCHELL.
AUTOMATIC SPRING VALVE CUT-OFF.
No. 292,758. Patented Jan. 29, 1884.
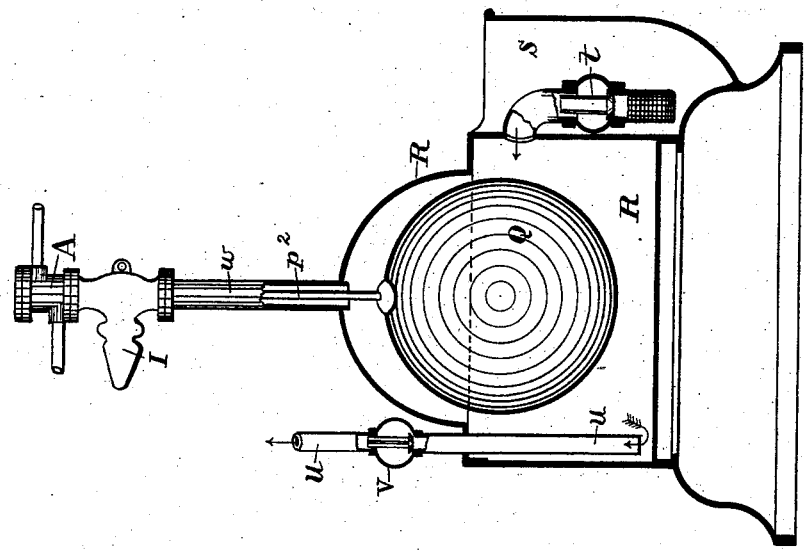
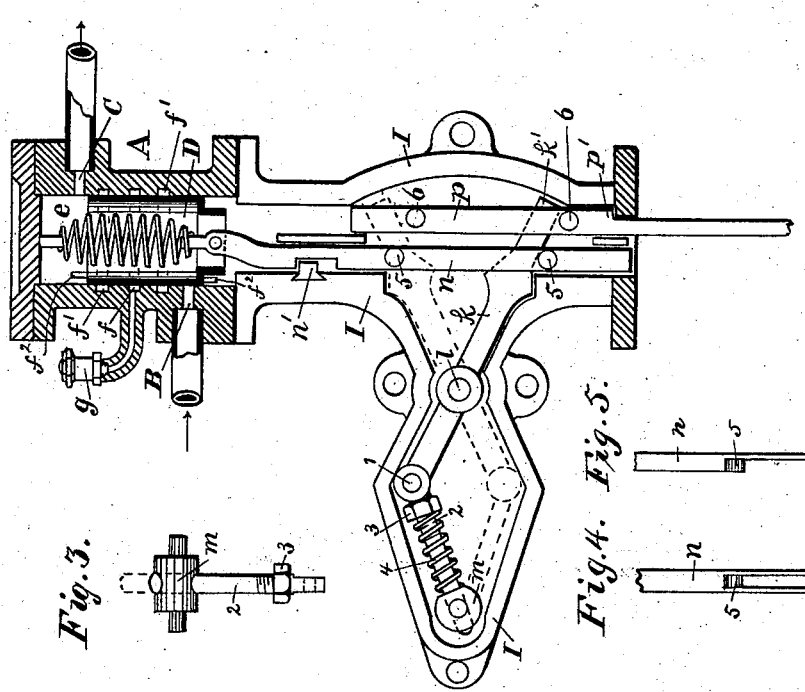
Witnesses:
A. E. Eader
John E. Morris.
Inventor
J. L. Mitchell
By Chas. B. Mann
Attorney.

UNITED STATES PATENT OFFICE.

JONAS L. MITCHELL, OF LOGAN, OHIO.

AUTOMATIC SPRING-VALVE CUT-OFF.

SPECIFICATION forming part of Letters Patent No. 292,758, dated January 29, 1884.

Application filed August 2, 1883. (No model.)

*To all whom it may concern:*

Be it known that I, JONAS L. MITCHELL, a citizen of the United States, residing at Logan, in the county of Hocking and State of Ohio, have invented certain new and useful Improvements in Automatic Spring-Valve Cut-Offs, of which the following is a specification.

My invention relates to an automatic cut-off for valves, which is here shown applied to a compressed-air water-elevator.

In the drawings annexed, which illustrate the invention, Figure 1 is a view of the working parts of the valve and cut-off. Fig. 2 is a view of a water-elevator wherein compressed air is the medium employed for raising the water, and showing the valve and cut-off applied to regulate the action of the compressed air. Fig. 3 shows the rod and tumbler. Fig. 4 shows a view of the valve-rod. Fig. 5 shows a modification in the valve-rod.

The letter A designates the valve-chamber; B, the inlet-port, (in this instance for the compressed air,) and C the outlet-port. The valve D reciprocates, so as to cover alternately first one and then the other of these ports. The valve is a cylinder open at both ends. In the present device the reciprocation of the valve is vertical, and to assist in the upward motion a lifting-spring, $e$, is provided. Three annular grooves, $f$ and $f'$, are turned out on the inner side of the valve-chamber. The center one, $f$, allows oil from the oil-cup $g$ to pass around the said chamber, thereby lubricating the valve. Connecting with each of the other annular grooves is a groove, $f^2$, one of which extends far enough to reach beyond the stroke of the valve D at one end, and the other one reaches beyond the stroke of the valve at the other end. The valve-cylinder slides across the annular grooves, and the other grooves give access of air to the annular grooves, thus allowing the compressed air to pass around and thereby so equalize the pressure as to enable the valve to move easily. The chest I incloses the cut-off mechanism, which shifts the valve, and in operation the compressed fluid fills this chest. In Fig. 1 one side of the chest is removed to expose the parts. A trip-lever, $k$, is pivoted at $l$, and has a throw or movement indicated by broken lines. One end is jointed at 1 to a rod, 2, which has play endwise freely through a tumbler or rock-shaft, $m$. The end of the rod close to the joint with the trip-lever is threaded, and has a nut, 3, and a spiral spring, 4, around the rod, and has one end resting on the tumbler and the other against the nut. This arrangement enables the spring to be readily tightened, so as to cause it to exert greater pressure on the trip-lever. When, in the throw of the trip-lever, both the rod 2 and trip-lever are in such position as to form a single straight line, the trip-lever may be said to be on its "dead-center," and the slightest additional movement then will allow the spring 4 at once to have action, and the trip-lever will thereby be instantly thrown to the opposite side. Inasmuch as the free end $k'$ of the jointed trip-lever may have movement to a position at each side of the point where its dead-center occurs, I describe it as having a "two-throw," both throws being made by one and the same spring. A rod, $n$, is attached to the valve, and moves endwise in a suitable guideway, and a stop device, $n'$, is provided to limit the movement of the rod. Two pins, 5, are fixed to the rod, and the space between the pins shows the extent of movement or "throw" of the free end of the trip-lever, because it is against these pins that the trip-lever strikes. The rod may be slotted, as shown in Fig. 4, with a pin at each end of the slot, and the free end of the trip-lever will have its throw in the slot. Each pin may have a friction-roller about it.

Instead of a slot and pins, the rod may have shoulders formed on one side at the same point where the pins are shown, as in Fig. 5. The lever would then strike against the shoulders. When the free end of the lever is moved upward, and instantly upon passing the dead-center, it will be thrown against the upper pin, 5, and thereby the valve will be quickly moved to open the inlet-port and close the outlet-port. Its promptness in moving gives a full port instantly. A rod, $p$, is attached to the float Q, and moves endwise, and has a stop, $p'$, to limit its movement. This rod is provided with pins 6, and is otherwise constructed like and operates in connection with the trip-lever, same as the other rod.

The mechanism heretofore described, not including the float, constitutes the automatic cut-off as arranged to operate a valve. It may be used for various purposes on pneumatic pumps, steam-pumps, boiler-feeders, &c. Fig. 2 shows its application to a compressed-air water-elevator or pneumatic pump.

The letter R designates a close water-chamber; S, a receptacle at one side, which contains the supply-water, or into which the supply is received.

t is a valve to allow the water to enter the chamber, but prevents its return.

u designates the outlet-pipe, through which the water is forced. The lower end of this pipe is near the bottom of the water-chamber.

v is a check-valve in the pipe, to prevent the water from returning to the chamber.

A pipe, w, connects the chest I of the cut-off and the water-chamber, and the float Q in the chamber is connected with the rod p in the chest by means of another rod, $p^2$, which passes through the connecting-pipe w. The float must have weight sufficient to draw the free end of the trip-lever down. When this movement takes place, the trip-lever will, instantly upon passing its dead-center, be thrown against the lower pin, 5, and thereby the valve D will be moved to close the air-inlet port and open the outlet-port.

The operation of the valve cut-off and water-elevator is as follows: The float being down, the supply of compressed air (from any source) is cut off by the closed port B. Water may now enter the chamber R, while the air escapes by the open outlet-port C. The water will raise the float, and thereby move the trip-lever. The entrance of water will continue and is not checked until the trip-lever passes its dead-center, when instantly the throw of the lever will shift the valve, thereby opening the inlet-port and closing the outlet-port. The compressed air then enters the chest and passes down the pipe w to the water-chamber. The valve t, in consequence of the pressure, closes, and the pressure of air on the water forces the latter out through the pipe u. When, by the lowering of the water in the chamber, the float has drawn the trip-lever down so far that it passes its dead-center, the valve will be again shifted, this time closing the inlet-port, thereby cutting off the supply of compressed air, and also opening the outlet-port, whereupon water will again flow into the chamber. This operation will continue and be repeated automatically as long as a supply of compressed air is furnished.

Having described my invention, I claim and desire to secure by Letters Patent of the United States—

1. Cut-off mechanism for valves, consisting of a pivoted trip-lever, a rod jointed to one end of the trip-lever and adapted to play endwise, and a spring whereby the trip-lever may throw each side of the dead-center point, substantially as set forth.

2. Cut-off mechanism for valves, consisting of a pivoted trip-lever, a tumbler or rock-shaft, a rod jointed to one end of the lever and passing freely through the tumbler, and a spring, substantially as set forth.

3. The combination, with a valve, of a pivoted trip-lever having one end jointed to the end of a rod, a spring to exert pressure on the rod toward the lever, and means to connect the other end of the trip-lever with the valve, as set forth.

4. The combination of a water-chamber having an inlet and outlet, each guarded by a valve, a compressed-air supply-pipe, an inlet and outlet port for the air, a valve adapted to alternately open and close the said air inlet and outlet ports, a float in the water-chamber, a trip-lever jointed to a spring-rod and adapted to throw both ways, and rods to connect the valve and float with the trip-lever, substantially as set forth.

In testimony whereof I affix my signature in presence of two witnesses.

JONAS L. MITCHELL.

Witnesses:
LLOYD MYERS,
CHRIS. NILL.